(12) United States Patent
Ohba et al.

(10) Patent No.: US 8,248,633 B2
(45) Date of Patent: Aug. 21, 2012

(54) IMAGE FORMING APPARATUS AND METHOD FOR SWITCHING BETWEEN SECURITY MODES

(75) Inventors: Shin Ohba, Toyokawa (JP); Kana Yamauchi, Toyohashi (JP); Toshihisa Motosugi, Okazaki (JP); Jiro Goto, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 134 days.

(21) Appl. No.: 12/816,424

(22) Filed: Jun. 16, 2010

(65) Prior Publication Data

US 2010/0321717 A1    Dec. 23, 2010

(30) Foreign Application Priority Data

Jun. 18, 2009   (JP) ................................. 2009-144964

(51) Int. Cl.
*G06K 15/00*  (2006.01)
(52) U.S. Cl. ........................ 358/1.14; 358/1.15; 358/1.1
(58) Field of Classification Search .................. 358/1.1, 358/1.15, 1.14
See application file for complete search history.

(56) References Cited

U.S. PATENT DOCUMENTS

2006/0181728 A1*  8/2006  Mori ............................ 358/1.14

FOREIGN PATENT DOCUMENTS

| JP | 2007-293515 | * | 11/2007 |
| JP | 2008-294572 | A | 12/2008 |
| JP | 2008294572  | * | 12/2008 |

OTHER PUBLICATIONS

English Translation JP2008294572.*
English Translation JP2007-293515.*
Office Action (Notification of Reason(s) for Refusal) dated May 10, 2011, issued in the corresponding Japanese Patent Application No. 2009-144964, and an English Translation thereof.

* cited by examiner

*Primary Examiner* — King Poon
*Assistant Examiner* — Iriana Cruz
(74) *Attorney, Agent, or Firm* — Buchanan Ingersoll & Rooney PC

(57) ABSTRACT

An image forming apparatus is provided with a determination portion that, in response to operation for giving instructions to enhance a security level thereof, determines whether or not a job is kept which is not to satisfy security requirements after the enhancement, an execution portion that, if the determination portion determines that such a job is kept, performs predetermined processing for satisfying the security requirements on the job with execution of the job ensured, and a security mode switching portion that, if the determination portion determines that such a job is kept, enhances the security level after the execution portion finishes the predetermined processing, and, if the determination portion determines that such a job is not kept, enhances the security level promptly.

12 Claims, 19 Drawing Sheets

CONFIDENTIAL DOCUMENT ID: 123

PASSWORD: ****

OK   CANCEL

IMAGE FORMING APPARATUS AND METHOD FOR SWITCHING BETWEEN SECURITY MODES

This application is based on Japanese patent application No. 2009-144964 filed on Jun. 18, 2009, the contents of which are hereby incorporated by reference.

BACKGROUND OF THE INVENTION

1. Field of the Invention

The present invention relates to an image forming apparatus and a method for switching between security modes for information equipment.

2. Description of the Related Art

Multifunction devices are one example of information equipment that is used for business purposes and called Office Automation (OA) equipment. Such multifunction devices have recently been known as Multi-Function Peripherals (MFPs) having a variety of functions, such as copying, printing, image inputting, fax communication, electronic mail communication, and data storage. Such a multifunction device is connected to an intranet, and operates in response to input operation through an operational panel provided in the multifunction device or in response to access from a computer connected to the intranet.

Such multifunction devices generally have a stored job function. The stored job function herein is used for a case where a job given to the multifunction device is a specific job called a "stored job". To be specific, the stored job function is to temporarily save such a stored job in the multifunction device instead of promptly executing the job, and to execute the job later at a time when a command to execute the job is issued or when a preprogrammed time is reached. A typical example of the stored job is a security print job. When causing the multifunction device to print a document, a user operating a computer can specify security printing (also called confidential printing). Upon specifying the security printing, the user enters a password for the security print job. The multifunction device stores therein the security print job given from the computer operated by the user. The user reaches the installation location of the multifunction device, enters a password through an operational panel thereof, and instructs the multifunction device to start printing. Responding to the instruction, the multifunction device executes the security print job saved therein. Such security printing enables a user to obtain a printed material of a document on site, which makes it possible to prevent somebody else from taking a look at the printed material or carrying away the printed material.

Further, such multifunction devices generally have a security function. The multifunction device for which security function is set to be available in the operation setting performs user authentication; thereby to prevent unspecified users from using the multifunction device. If a user is not given an access right, he/she is prohibited from accessing data and jobs stored in the multifunction device even if he/she is successfully authenticated through the user authentication.

Multifunction devices having a plurality of security modes are configured to raise or lower the security level thereof depending on the environment for the use thereof and the operational situation thereof. In general, if the security level of a multifunction device is enhanced, the operation thereof becomes complicated. For example, if the security level is raised, a user is required to enter a password having a digit greater than that of a password used before raising the security level. In view of this, it may be conceived that the multifunction device is used in such a manner that the security level thereof is not enhanced usually, and the security mode is appropriately turned into a security enhanced mode if necessary to raise the security level thereof.

There is proposed a conventional technique for switching between security modes of an image forming apparatus (Japanese Laid-open Patent Publication No. 2008-294572). According to the technique, if the image forming apparatus stores a confidential job therein at a time when the security mode is turned into a mode for reducing the security level, the image forming apparatus issues a warning and displays information for prompting a user to delete the confidential job, or deletes the confidential job. The technique prevents an undesirable situation in which a person other than the user can easily access the confidential job.

In the case where the security level is enhanced by changing the security mode, a case arises in which a user cannot access, among stored jobs and data that are already saved, stored jobs and data not satisfying security requirements after enhancing the security level. In some cases, for example, a password given to a stored job does not satisfy password regulations after enhancing the security level. In such a case, a password entered by a user is not accepted, so that the user cannot cause the image forming apparatus to execute the stored job.

A case in which a job not satisfying the security requirements remains saved does not correspond to a case in which the security level has been raised. It is possible, therefore, that such a job is forcibly erased. The erasure of the job, however, may confuse a user who is to cause the image forming apparatus to execute the job.

SUMMARY

The present disclosure is directed to solve the problems pointed out above, and therefore, an object of an embodiment of the present invention is to enhance the security level of an image forming apparatus in a manner to ensure execution of a job already saved therein.

According to an aspect of the present invention, an image forming apparatus having a function to store a job therein and to execute the job in accordance with a command is provided. The image forming apparatus includes a determination portion that, in response to operation for giving instructions to enhance a security level of the image forming apparatus, determines whether or not the image forming apparatus keeps a job that is not to satisfy security requirements after the security level is enhanced, an execution portion that, if the determination portion determines that the image forming apparatus keeps a job that is not to satisfy the security requirements, performs predetermined processing for satisfying the security requirements of the image forming apparatus with execution of the job ensured, and a security mode switching portion that, if the determination portion determines that the image forming apparatus keeps a job that is not to satisfy the security requirements, enhances the security level after the execution portion finishes the predetermined processing, and, if the determination portion determines that the image forming apparatus does not keep a job that is not to satisfy the security requirements, enhances the security level promptly.

These and other characteristics and objects of the present invention will become more apparent by the following descriptions of preferred embodiments with reference to drawings.

BRIEF DESCRIPTION OF THE DRAWINGS

FIG. 12 is a diagram illustrating an example of a password entry screen for operation.

DESCRIPTION OF THE PREFERRED EMBODIMENTS

An image forming apparatus executing a print job is herein taken as an example of information equipment configured to switch between security modes. First, the configuration of an image information processing system including the image forming apparatus is described, and then, steps of a process for enhancing the security level of the image forming apparatus are described.

Figure 1:
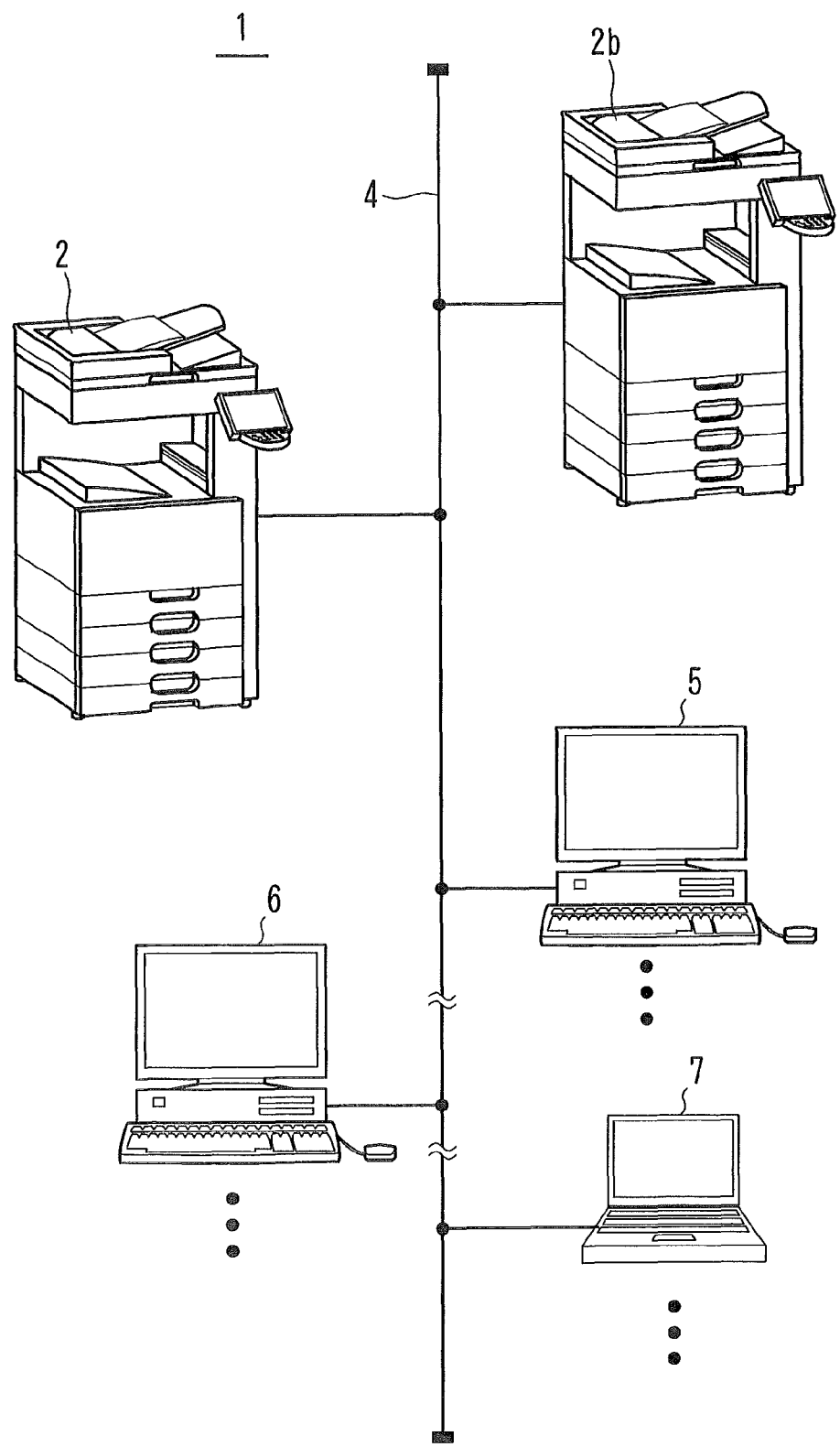
FIG. 1 is a diagram illustrating an example of the configuration of an image information processing system.

Referring to FIG. 1, an image information processing system 1 is configured of a plurality of image forming apparatuses 2 and 2b and a plurality of clients 5-7. The image forming apparatuses 2 and 2b are to print images onto paper. The clients 5-7 are to send print jobs to the image forming apparatuses 2 and 2b. In this example, the image forming apparatus 2 has the same configuration as that of the image forming apparatus 2b, and both the image forming apparatuses 2 and 2b are multifunction devices. Such a multifunction device is information equipment having a multiple of functions and is also called an MFP. Such a multifunction device has basic functions such as a copy function and a network printing function, and also has other various functions such as an image input function, a fax communication function, an electronic mail communication function, and a document saving function. Each of the image forming apparatuses 2 and 2b contains, therein, a hard disk drive as a storage for saving documents. The clients 5-7 are information processing devices such as personal computers. The image forming apparatuses 2 and 2b and the clients 5-7 are configured to access one another and exchange data with one another via a network 4 including a wire or wireless communication path.

Figure 2:
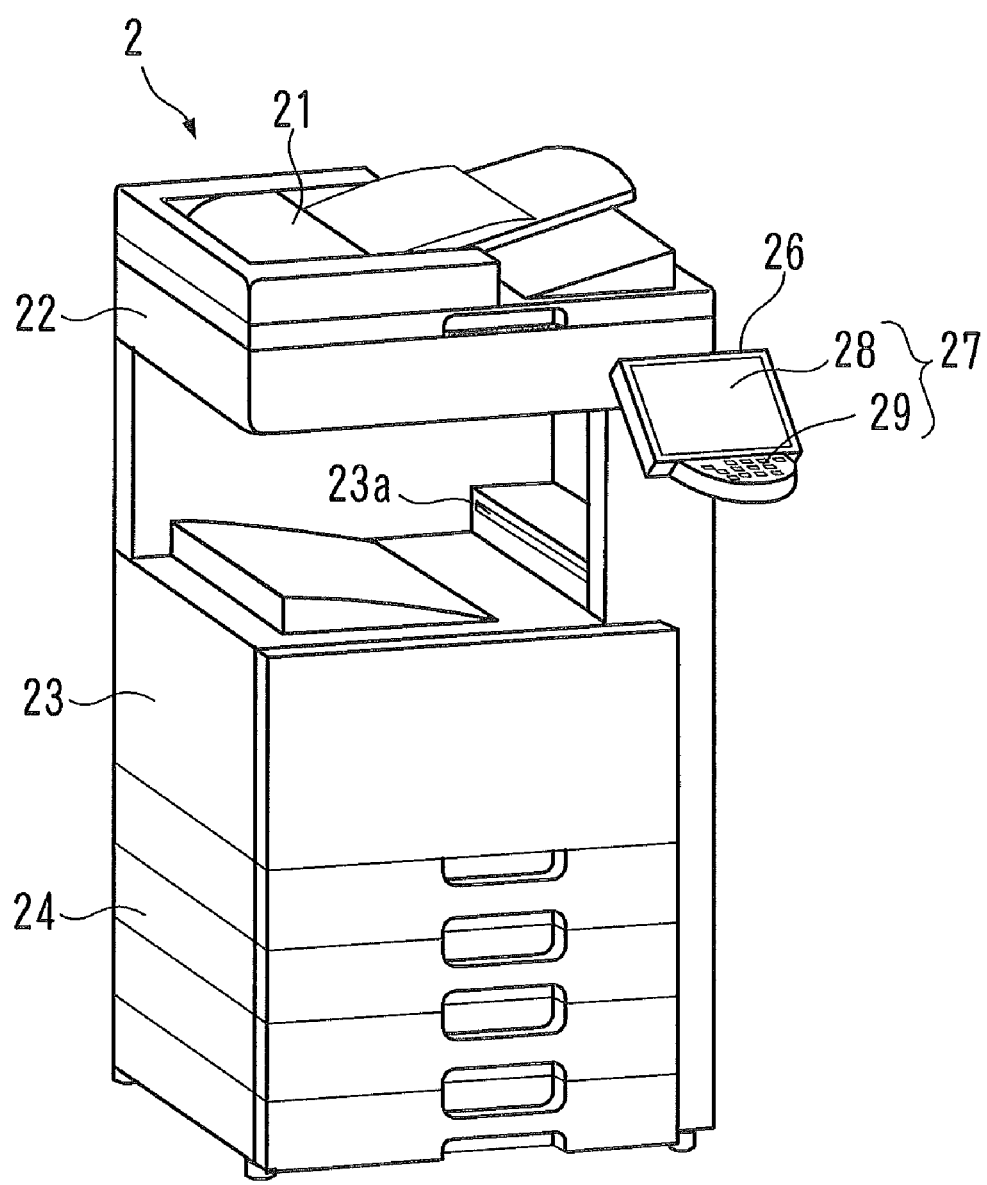
FIG. 2 is an external view of an image forming apparatus.

FIG. 2 is a diagram of the image forming apparatus 2 as a representative example of the image forming apparatuses 2 and 2b. Referring to FIG. 2, the image forming apparatus 2 includes a document feeder 21, a scanner portion 22, a printer portion 23, and a paper supplying portion 24. These four portions are stacked vertically to create a tower-like shape. The document feeder 21, which is located at the top of the four portions, serves to automatically deliver original documents set by a user one by one to the scanner portion 22 located therebelow. The scanner portion 22 serves to optically read information printed on the original documents, such as characters, symbols, and images. The printer portion 23 provided below the scanner portion 22 forms an image onto paper supplied from the paper supplying portion 24 in order to execute a job such as copying, network printing, or fax reception. The paper on which the image is formed is ejected from a paper output slot 23a as a print output. The paper supplying portion 24, which is located at a lower portion, is provided with a multiple-stage sheet tray, and is operable to selectively supply paper of size depending on a specified job to the printer portion 23.

A user directly operates the image forming apparatus 2 to cause the same to execute a desired job. A display portion 26 and an operational portion 27 are provided in front of the scanner portion 22 as a man-machine interface for operating the image forming apparatus 2. The display portion 26 includes a Liquid Crystal Display (LCD) as a display for displaying operation screens, and serves to display, for a user, information on a job or other information. The operational portion 27 includes a touchscreen 28 laid on the front face of the display of the display portion 26 and operational buttons 29 provided near the display.

Figure 3:
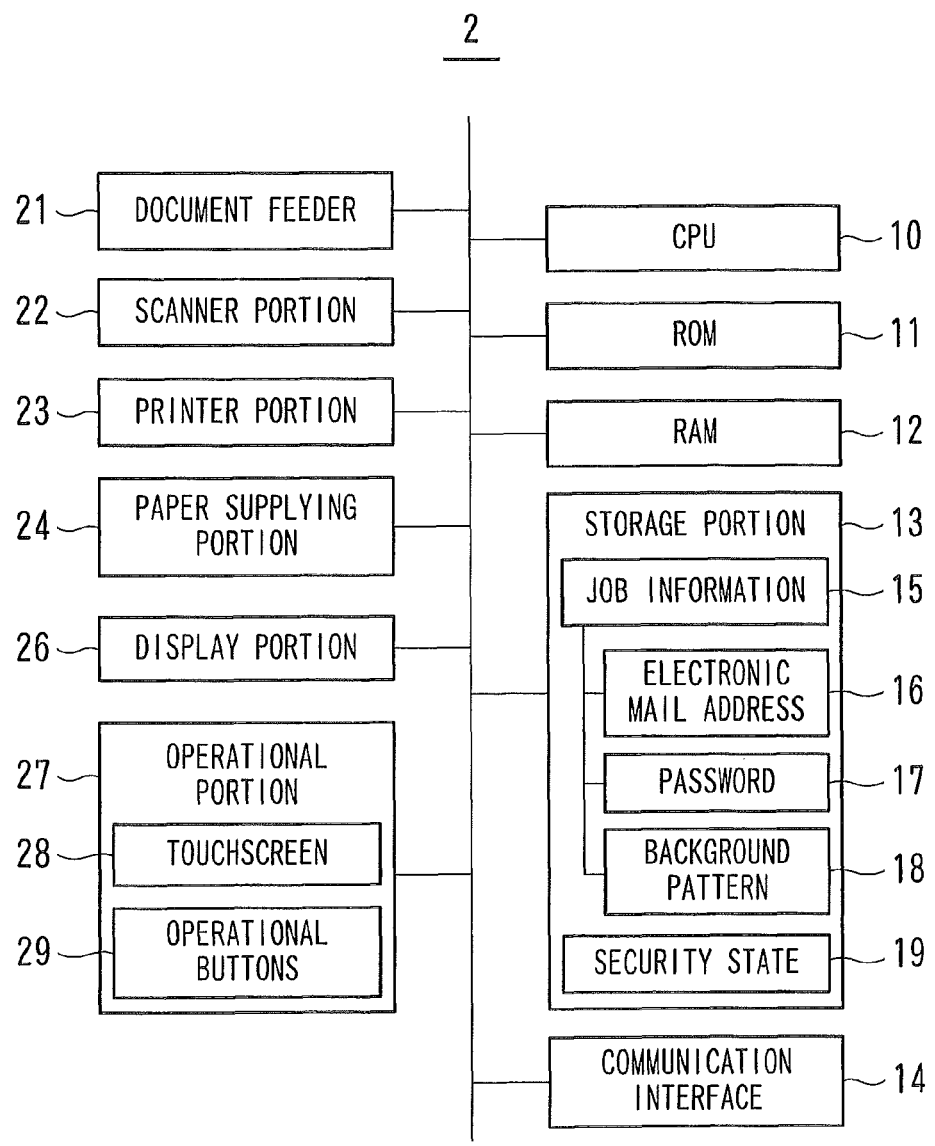
FIG. 3 is a diagram illustrating an example of the hardware configuration of an image forming apparatus.

Referring to FIG. 3, in addition to the components described above, the image forming apparatus 2 is provided with, as components constituting a control circuit, a Central Processing Unit (CPU) 10, a Read-Only Memory (ROM) 11, a Random Access Memory (RAM) 12, a storage portion 13, a communication interface 14, and the like. The CPU 10 reads out a program stored in the ROM 11, loads the program into the RAM 12, and executes the program. This implements a function for forming an image and a function for switching between security modes. The storage portion 13 includes a storage device such as a hard disk drive or a semiconductor memory, and a circuit for accessing the storage device. The communication interface 14 serves to perform data communication with the clients 5-7 or another information processing device via the network 4 and perform facsimile communication via a telephone line. The program stored in the ROM 11 is downloaded from an external device via the network 4 or the Internet if necessary, and is updated with the latest version of the program.

A part of a non-volatile memory area of the storage portion 13 is used as a so-called box, and another part thereof is used for storing data relating to the control of the image forming apparatus 2. The box is used by individual users of the clients 5-7 to save files of electronic data of various documents, or by an administrator to save management data. The storage portion 13 stores, therein, job information 15 and security state 19.

As described just above, the storage portion 13 stores the job information 15 therein. The job information 15 is information on a stored job, and includes information on the number of printings, sorting information, and double-sided printing designation information. The job information 15 sometimes contains, therein, an electronic mail address 16, a password 17, and a background pattern 18 in the case where a job is received via the network 4. The electronic mail address 16 is an electronic mail address registered for a user using the client 5 that has generated the job. The password 17 is authentication information to be entered by the user using the client 5 that has generated the job. In this example, the password 17 is used for execution of a security print job or a password-protected box saving job. The background pattern 18 is information on the details of setting performed on a background pattern by the user using the client 5 that has generated the job. In the process of printing a document, a background pattern such as a predetermined character or drawing is applied to the document. Then, when the document is copied, the background pattern becomes visible in the copy. The background pattern discourages duplication of such a document.

The storage portion 13 also stores the security state 19 therein. The security state 19 indicates a setting state of the security level of the image forming apparatus 2, i.e., the current security mode thereof. The security mode comes in two forms: a non-enhanced mode and an enhanced mode of which the security level is higher than that of the non-enhanced mode. In a state in which the security level of the image forming apparatus 2 is set to high by setting the enhanced mode, i.e., in an enhanced mode ON state, a stored job that does not meet password regulations stricter than those in a non-enhanced state is discarded immediately after the stored job is received. In the enhanced mode ON state, a stored job that meets the password regulations is always encrypted when the stored job is saved.

Figure 4:
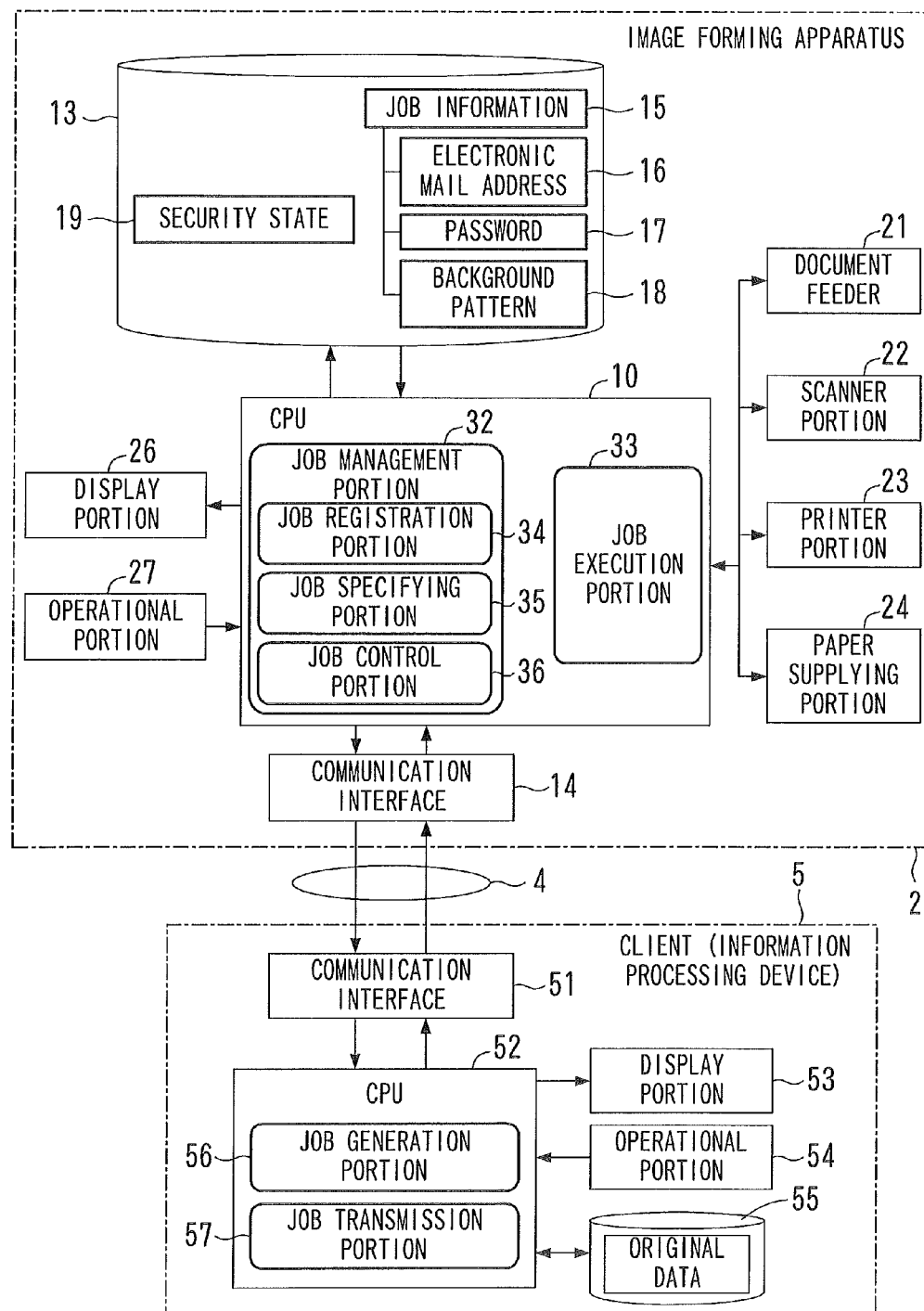
FIG. 4 is a block diagram illustrating an example of the functional configuration of an image information processing system.

FIG. 4 is a diagram illustrating an example of the functional configuration of the image information processing system 1.

With the image forming apparatus 2, the CPU 10 executes the program; thereby functions of a job management portion 32 and a job execution portion 33 are implemented. The job management portion 32 reads out a stored job to be executed from the job information 15, and causes the job execution portion 33 to execute the stored job thus read out. The job management portion 32 includes a job registration portion 34, a job specifying portion 35, and a job control portion 36. The job registration portion 34 registers, in the job information 15, a stored job received via the network 4. The job specifying portion 35 specifies one of a plurality of stored jobs registered in the job information 15. The job control portion 36 controls the storage portion 13 to store therein the stored job received via the network 4. At this time, the job control portion 36 converts document data included in the stored job into image data for printing. The job execution portion 33 is a functional element to execute a job conveyed by the job management portion 32. For example, at a time when receiving a print job, the job execution portion 33 controls the driving of the document feeder 21, the scanner portion 22, the printer portion 23, and the paper supplying portion 24.

The client 5, which is taken as a representative example of the clients 5-7 in FIG. 4, includes a communication interface 51, a CPU 52, a display portion 53, and an operational portion 54. The communication interface 51 serves to perform data communication with the image forming apparatus 2 via the network 4. The CPU 52 executes a control program and an application program, and implements a variety of functions as the information processing device. In the case where a user of the client 5 operates the operational portion 54 including a keyboard and a mouse to enter a print command, the CPU 52 executes a printer driver (software); thereby functions of a job generation portion 56 and a job transmission portion 57 are implemented.

If the user of the client 5 selects a file based on which printing is to be performed, i.e., original data, from among a plurality of files stored in a hard disk drive 55, and gives a print command, then the printer driver causes the display portion 53 to display predetermined operation screens. The operation screens are, for example, a screen on which a security printing ID and a password are entered, and a screen on which setting for a background pattern is performed. The job generation portion 56 generates a job into which the original data as the print target is incorporated in accordance with operation performed by the user. The job transmission portion 57 sends the job generated to the image forming apparatus 2.

With the image information processing system 1 having the configuration described above, the security level of the image forming apparatus 2 is raised in the following manner.

In this example, an administrator of the image forming apparatus 2 performs operation for switching between security modes. The administrator operates the operational portion 27 of the image forming apparatus 2 to perform predetermined input operation such as entering an administrator password. Then, a security mode changing screen Q10 as illustrated in FIG. 5A is displayed on the display portion 26.

Figure 5A:
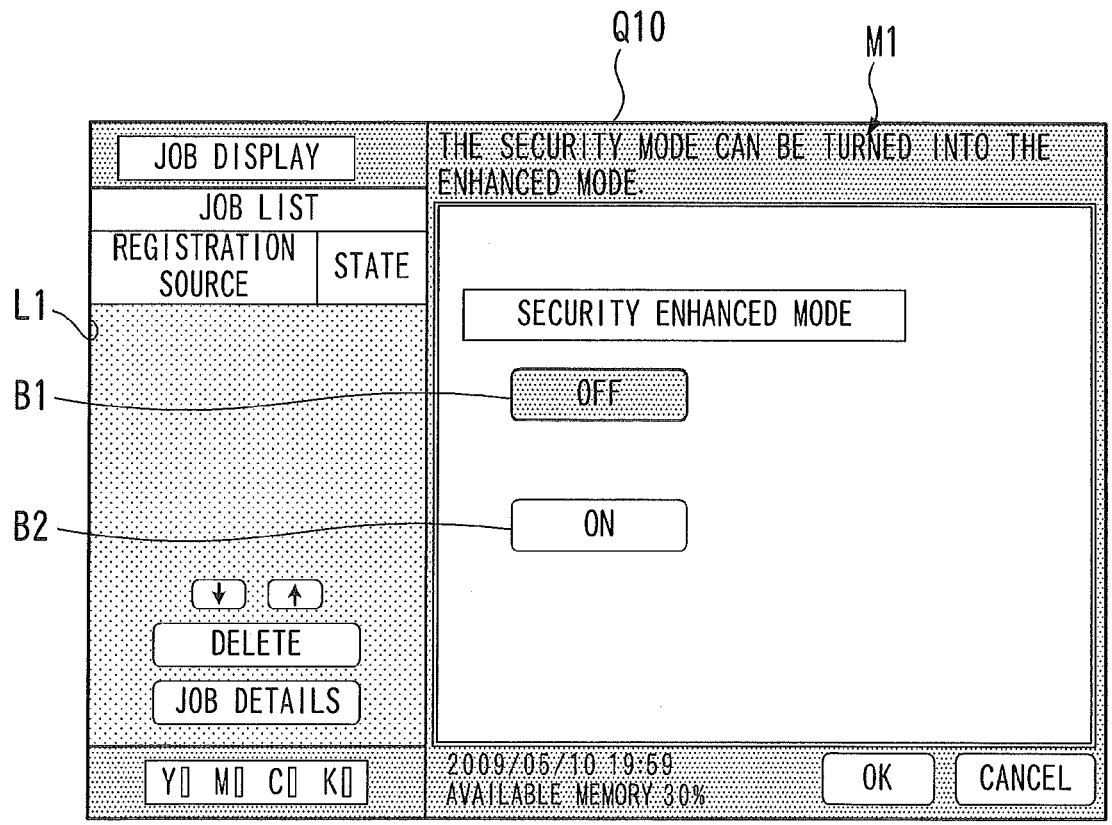
FIGS. 5A and 5B are diagrams illustrating an example of a security mode switching screen for security setting operation.

Referring to FIG. 5A, a job list L1 is provided on the left side of the security mode changing screen Q10, and a guidance message M1 and two setting buttons B1 and B2 are displayed on the right side of the job list L1. The setting button B1 (OFF button) is pressed to turn the security mode from the enhanced mode into the non-enhanced mode, while the setting button B2 (ON button) is pressed to turn the security mode from the non-enhanced mode into the enhanced mode. In the illustrated example, the setting button B1 is highlighted to indicate that the security mode is set to the non-enhanced mode.

A list of jobs waiting to be executed which are issued by the clients 5-7 is displayed in the form of the job list L1. Note, however, that a stored job is not displayed in the job list L1 during a period after a command to execute the stored job is given until the stored job is turned into a state of waiting to be executed. Switching between security modes is usually performed when there are no jobs waiting to be executed. Referring to FIG. 5A, no jobs are indicated in the job list L1. This means that there are no jobs waiting to be executed.

Figure 5B:
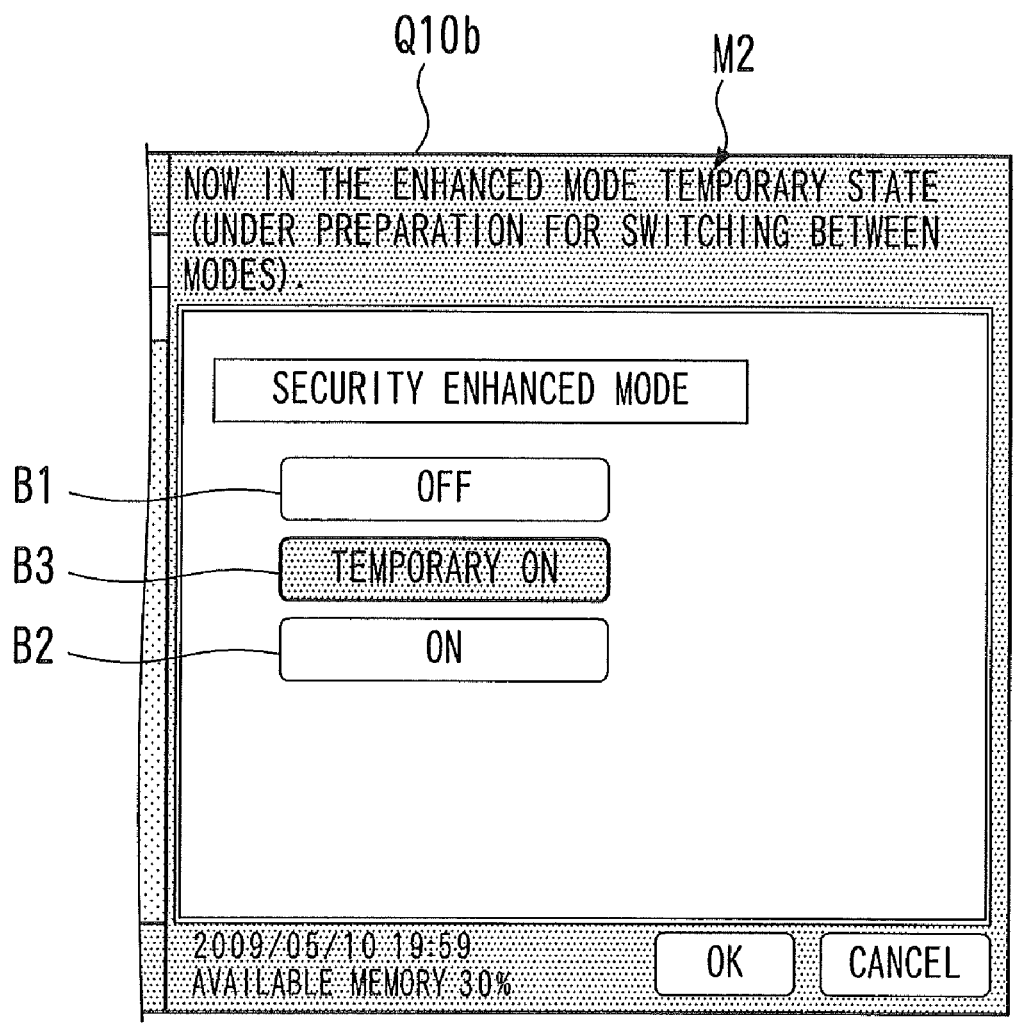

The administrator presses the setting button B2 in order to raise the security level of the image forming apparatus 2. Responding to this, predetermined processing, which will be detailed later, is taken on a stored job saved in the image forming apparatus 2, and, after the predetermined processing, the security mode is turned from the non-enhanced mode into the enhanced mode. A state corresponding to a period between when the predetermined processing starts and when the security mode is changed to the enhanced mode is herein called an "enhanced mode temporary ON state". In the enhanced mode temporary ON state, a security mode changing screen Q10b is displayed as shown in FIG. 5B. The security mode changing screen Q10b includes a temporary ON button B3 and a guidance message M2. The temporary ON button B3 is an icon merely indicating that the image forming apparatus 2 is set to the enhanced mode temporary ON state. Even when the temporary ON button B3 is pressed, no change occurs in the state of the image forming apparatus 2.

The length of the period corresponding to the enhanced mode temporary ON state is not defined. In one case, a temporary enhancement setting routine process for the predetermined processing may be finished promptly. Such a case is, for example, a case in which no stored jobs are saved. In another case, the enhanced mode temporary ON state may continue over a period of, for example, a couple of days through two weeks which is defined as an extra time for switching between security modes. In the case where the enhanced mode temporary ON state continues over a long period of time, the administrator preferably finishes an administrator mode once, and changes the indication to a user mode in which the user operation screen is displayed. Then, the administrator preferably displays the security mode changing screen Q10 once again later at appropriate timing, and checks whether or not the image forming apparatus 2 is set to the enhanced mode. At this time, if the image forming apparatus 2 is set to the enhanced mode, then the setting button B2 rather than the setting button B1 is highlighted (not shown) on the security mode changing screen Q10. In contrast, if the image forming apparatus 2 is set to the enhanced mode temporary ON state, then the security mode changing screen Q10b is displayed.

While the image forming apparatus 2 is set to the enhanced mode temporary ON state, security requirements in the enhanced mode are applied to a job newly conveyed by the clients 5-7 through communication or conveyed through direct operation of the image forming apparatus 2. To be specific, it is necessary, for example, that a password given to such a newly-conveyed job satisfies password regulations in the enhanced mode. Accordingly, this prevents an undesirable situation in which inputting a new job lowers the security level of the image forming apparatus 2.

The processing for protecting a stored job is performed while the image forming apparatus 2 is in the enhanced mode temporary ON state. The protection processing is performed for the following purposes: to prevent an inconvenient situation in which the user is not accessible to a stored job not satisfying the security requirements in the enhanced mode; and to promptly finish an unfavorable situation in which such a stored job remains saved in the image forming apparatus 2. In this example, the following three processes are defined as options for the protection processing performed on a stored job.

i) The stored job is transferred to an external device (another device) that can execute and save the stored job.

ii) Data included in the stored job is encrypted and the encrypted data is sent back, through electronic mail communication, to a user who is the request source of the stored job.

iii) The stored job is saved in a storage portion for an administrator.

The following is a description as to how the image forming apparatus 2 operates to raise the security level thereof, with reference to flowcharts.

Figure 6:
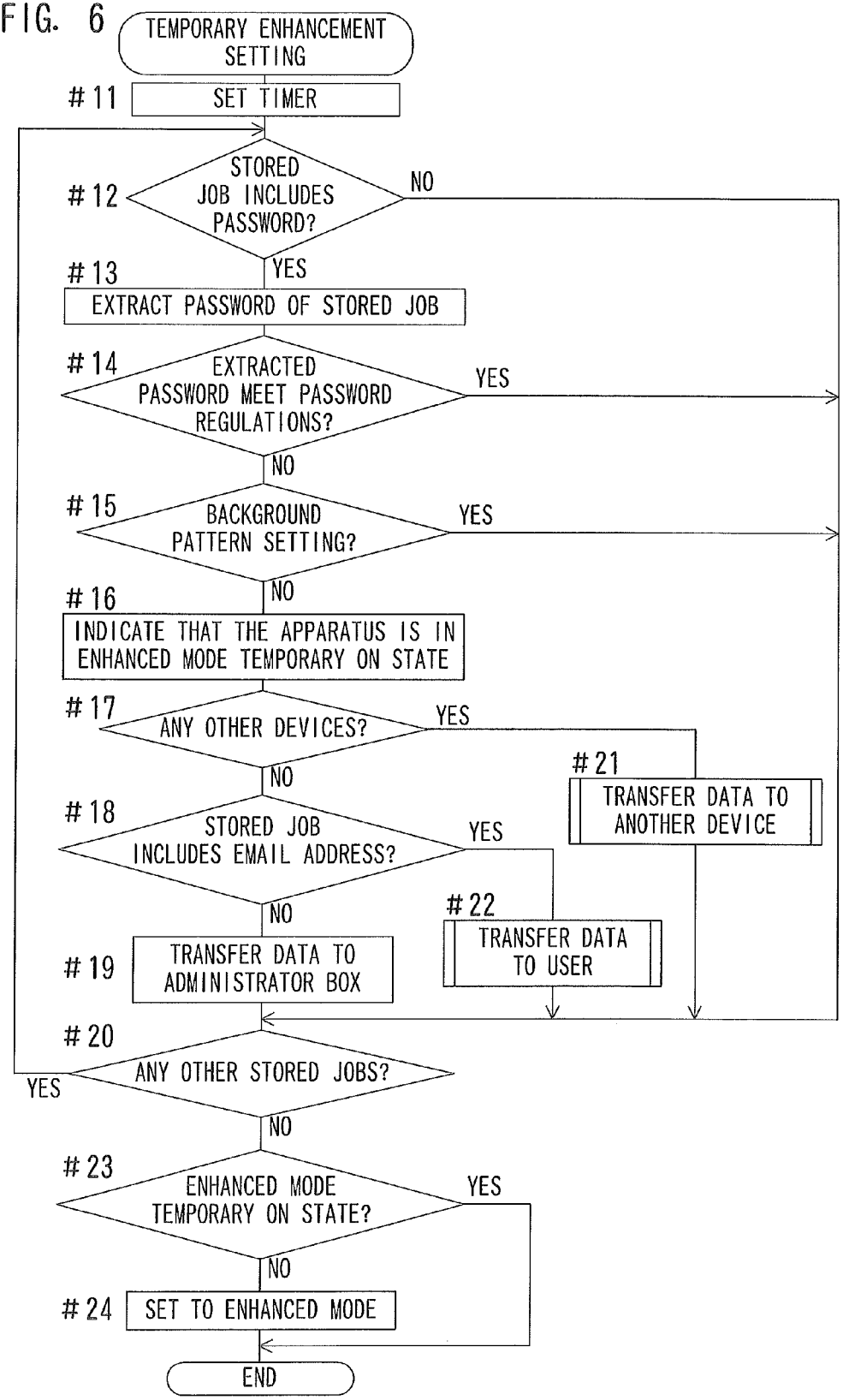
FIG. 6 is a flowchart illustrating an example of a temporary enhancement setting process for setting an enhanced mode.

At a time when the setting button B2 (ON button) is pressed on the security mode changing screen Q10, the image forming apparatus 2 performs a temporary enhancement setting process shown in FIG. 6. First, the image forming apparatus 2 sets a timer for defining the maximum length of a period during which the image forming apparatus 2 is in the enhanced mode temporary ON state (#11). Setting a timer herein is preferably to perform a process for enabling the determination of an amount of time elapsed since the setting button B2 was pressed. Setting a timer herein is not limited to the start of the count of the time using a counter, and may be to store the date and time at which the setting button B2 has been pressed.

The image forming apparatus 2 searches for a password-protected stored job among all the stored jobs saved in the storage portion 13 (#12 and #20). If a password-protected stored job is found by the search, then the image forming apparatus 2 extracts the password from the password-protected stored job (#13). In the case where bi-directional encryption/decoding using a common key is possible, the common key is used to decode the encrypted password. The image forming apparatus 2, then, checks whether or not the password extracted satisfies the password regulations in the enhanced mode (#14). Note that a stored job protected by a password satisfying the password regulations in the enhanced mode is not subjected to the protection processing. If the password of the stored job does not satisfy the password regulations in the enhanced mode, then the image forming apparatus 2 further checks whether or not there is a background pattern setting in the stored job (#15). According to the security policy of this example, the background pattern setting, which has the advantage of discouraging duplication, corresponds to the enhancement of the security level. Accordingly, a stored job of which the password does not satisfy the password regulations in the enhanced mode and in which there is no background pattern setting is a job that does not satisfy the security requirements in the enhanced mode, and such a stored job is a target for the protection processing.

If a stored job checked in this way is determined to be a target for the protection processing, then the image forming apparatus 2 displays the security mode changing screen Q10b shown in FIG. 5B (#16). The guidance message M2 and the highlighted temporary ON button B3 on the security mode changing screen Q10b are to inform an administrator that the image forming apparatus 2 is currently in the enhanced mode temporary ON state. Immediately following the display of the security mode changing screen Q10b, the image forming apparatus 2 starts the predetermined protection processing.

In this example, any one of the three process options indicated above is performed on the individual stored jobs that are targets for the protection processing. Any one of the three processes may be selected as long as the processes are executable. In this example, however, one of the processes is selected in the following manner.

The image forming apparatus 2 checks whether or not there are any other devices that can accept the stored job (#17). In order to accept the stored job, a device is required to be set to the non-enhanced mode, an equivalent mode thereto, or a mode of which security requirements are lower than those of the non-enhanced mode, and at the same time, to have a function not only to save the stored job but also to execute the stored job. With the image information processing system 1 of this example, if the image forming apparatus 2b, which has the same configuration as that of the image forming apparatus 2, is set to the non-enhanced mode, the image forming apparatus 2b is a candidate for a device that can accept the stored job. Such a device is hereinafter referred to as an "accepting device". Note, however, that the accepting device is not limited to an image forming apparatus having the same configuration as that of the image forming apparatus 2. There is proposed, as a method for checking whether or not an accepting device is present, a method for outputting, to the network 4, broadcast packets for inquiring a mode, and checking a response therefrom. A situation may occur in which the security level of the image forming apparatus 2B is not set to high although the security level of the image forming apparatus 2 is set to high. Such a situation probably occurs for a case where system operational arrangements are made such that the image forming apparatus 2 is used to save or output data more important than other data.

If an accepting device is found, then the process goes to an another device transfer routine (#21), and the image forming apparatus 2 transfers the stored job to the accepting device. If no accepting device is found, then the image forming apparatus 2 checks whether or not the stored job includes an electronic mail address (#18). If the stored job includes an electronic mail address, then the process goes to a user transfer routine (#22), and the image forming apparatus 2 sends, to the user, an electronic mail message to which data on the stored job is attached as described later.

In the case where the stored job can neither be transferred to another device nor be sent back to the user, the image forming apparatus 2 takes security measures on the stored job and keeps the stored job therein. To be specific, the image forming apparatus 2 moves the stored job from the memory area in which the stored job itself is memorized to a password-protected administrator box provided to provisionally save data to be erased (#19). The stored job is encrypted using a password contained therein before being saved in the administrator box.

If the image forming apparatus 2 is not in the enhanced mode temporary ON state at a time when the determination is finished as to whether or not the protection processing is necessary for all the stored jobs, then the image forming apparatus 2 sets the security mode thereof to the enhanced mode (#23 and #24). Thereby, the security mode is turned from the non-enhanced mode into the enhanced mode.

The CPU 10 executing the process of Steps #12 through #18 in the temporary enhancement setting process corresponds to a determination portion for determining whether or not there are any jobs that are not to satisfy the security requirements after the security level is raised. The CPU 10 executing the process of Steps #19 through #21 corresponds to an execution portion for performing predefined protection processing for satisfying the security requirements with execution of a job ensured. The CPU 10 executing the process of Steps #23 and #24 and an enhancement setting routine, described later with reference to FIG. 9, corresponds to a security mode changing portion for enhancing the security level of the image forming apparatus 2.

Figure 7:
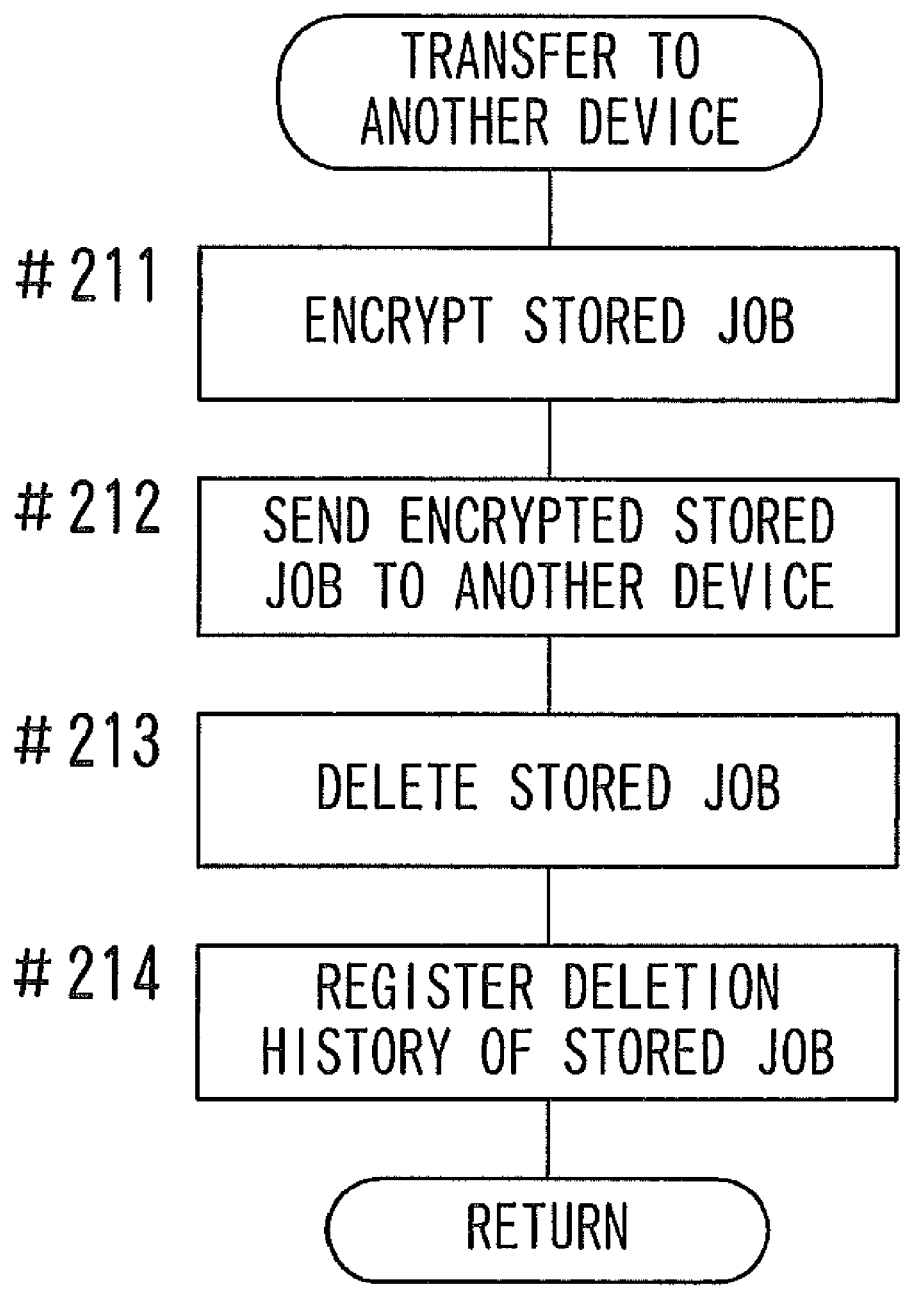
FIG. 7 is a flowchart illustrating an example of an another device transfer routine in protection processing of a stored job.

FIG. 7 is a flowchart depicting a process of an another device transfer routine. The image forming apparatus 2 encrypts a stored job by using a password contained in the stored job (#211), and transmits the stored job encrypted to an accepting device (#212). After receiving a normal response from the accepting device and completing the transmission of the encrypted stored job, the image forming apparatus 2 erases the stored job from the storage portion 13, deletes the registration of the stored job (#213), and registers a deletion history (#214).

Figure 8:
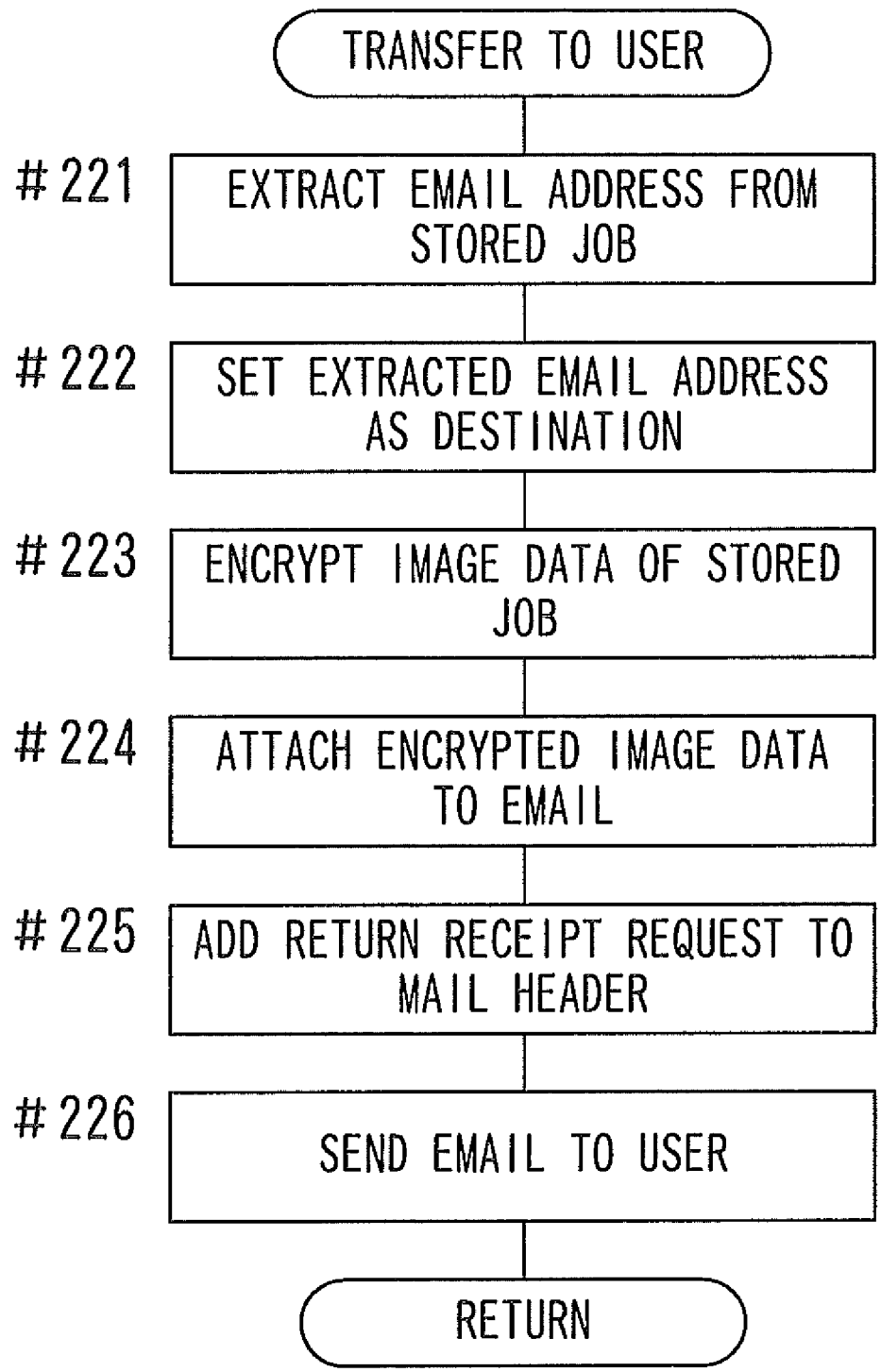
FIG. 8 is a flowchart illustrating an example of a user transfer routine in protection processing of a stored job.

FIG. 8 is a flowchart depicting a process of a user transfer routine. The image forming apparatus 2 extracts an electronic mail address from a stored job and sets the same as the destination of an electronic mail message (#221 and #222). The image forming apparatus 2 uses a password contained in the store job to encrypt image data of the stored job (#223). The image forming apparatus 2, then, add the encrypted image data to the electronic mail message as an attachment file (#224). The image forming apparatus 2 further adds a return receipt request to the mail header (#225), and sends the electronic mail message to the user (#226).

The stored job is not deleted immediately after the electronic mail message is sent. In this example, the stored job is deleted after the image forming apparatus 2 receives a return receipt for informing the image forming apparatus 2 that the electronic mail message sent thereby has been opened by the user at the destination. It is not known exactly when the user is to open the electronic mail message. It is possible, for example, that the image forming apparatus 2 receives the return receipt a couple of days after the electronic mail message has been sent. The check as to whether the return receipt is received is performed based on an enhancement setting routine depicted in FIG. 9. The enhancement setting routine is one of routines incorporated into a control loop that is to be executed repeatedly while the image forming apparatus 2 is turned ON. The enhancement setting routine is executed automatically.

Figure 9:
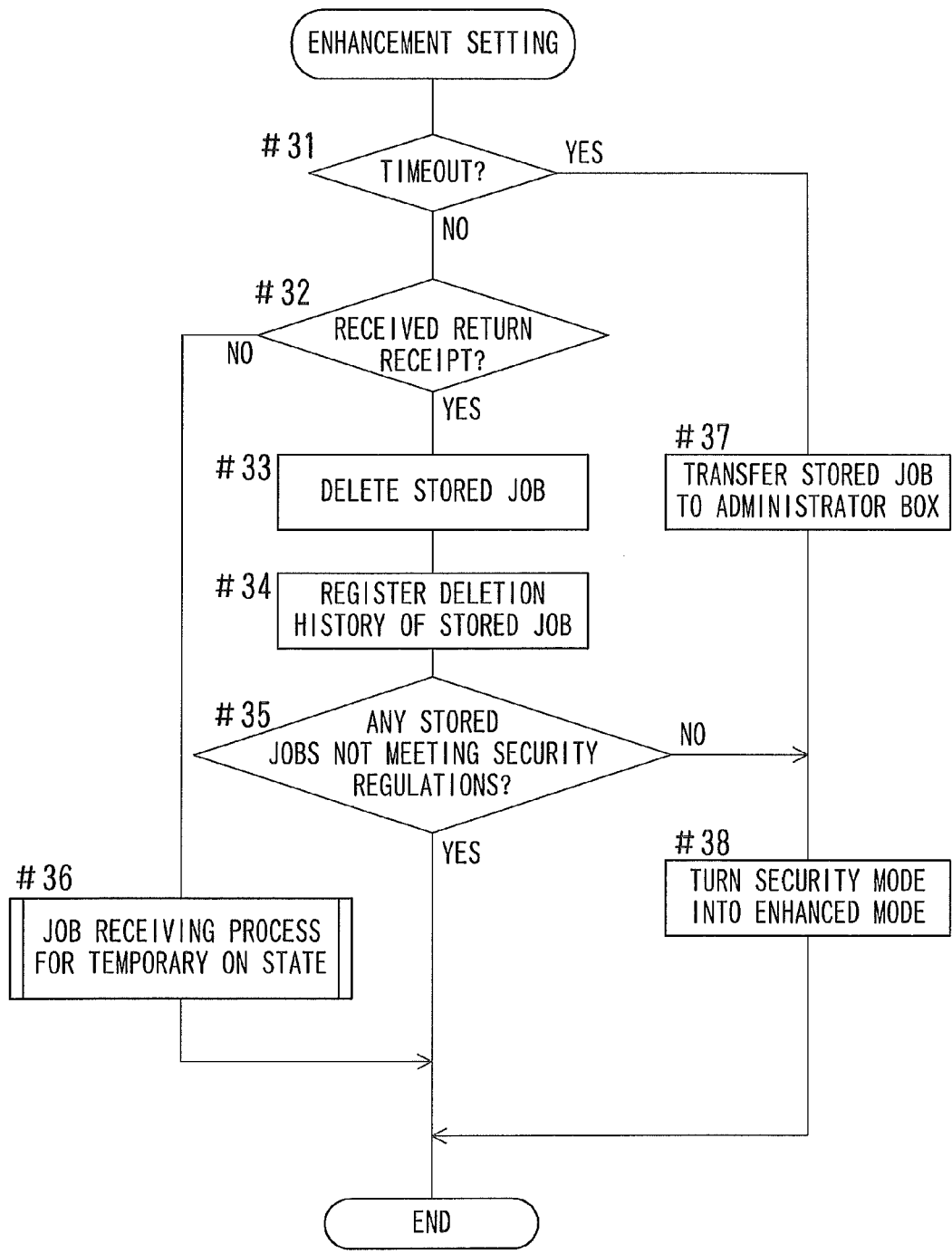
FIG. 9 is a flowchart illustrating an example of an enhancement setting routine.

In the enhancement setting routine of FIG. 9, the image forming apparatus 2 first checks whether or not a timeout occurs (#31). The timeout herein means that the length of a period from when the image forming apparatus 2 has become the enhanced mode temporary ON state, which is the current state thereof, to when the present time reaches a predefined length of the time. Stated differently, such a check is to check whether it falls within an extra period for turning the security mode from the non-enhanced mode into the enhanced mode, or, alternatively, the extra period is expired.

If it falls within the extra period, then the image forming apparatus 2 checks whether or not the return receipt has been received (#32). The receipt of the return receipt means that the electronic mail message sent in the user transfer routine has been correctly delivered to the user at the destination. The return receipt may be intentionally sent by the user through a job notification or a return electronic mail message, or, alternatively, may be automatically sent by a means, contained in the clients 5-7, which detects that the electronic mail message has been opened.

Upon receiving the return receipt, the image forming apparatus 2 deletes the stored job that has remained undeleted therein (#33), and registers the deletion of the stored job in the history information (#34). If, after the deletion of the stored job this time, there are no other stored jobs for which the return receipt is to be waited, and at the same time, there are no other stored jobs that are to be subjected to the protection processing, then the image forming apparatus 2 turns the security mode into the enhanced mode (#35 and #38). In this way, the mode change action of the image forming apparatus 2 in response to the press of the setting button B2 is completed. In contrast, if not receiving the return receipt, then the image forming apparatus 2 performs a job receiving routine process for temporary ON state (#36).

On the other hand, if the extra period is expired, then the image forming apparatus 2 transfers the stored job for which the return receipt is to be waited to the administrator box (#37), and then, turns the security mode into the enhanced mode (#38). In short, the enhanced mode temporary ON state is forcibly finished.

Figure 10:
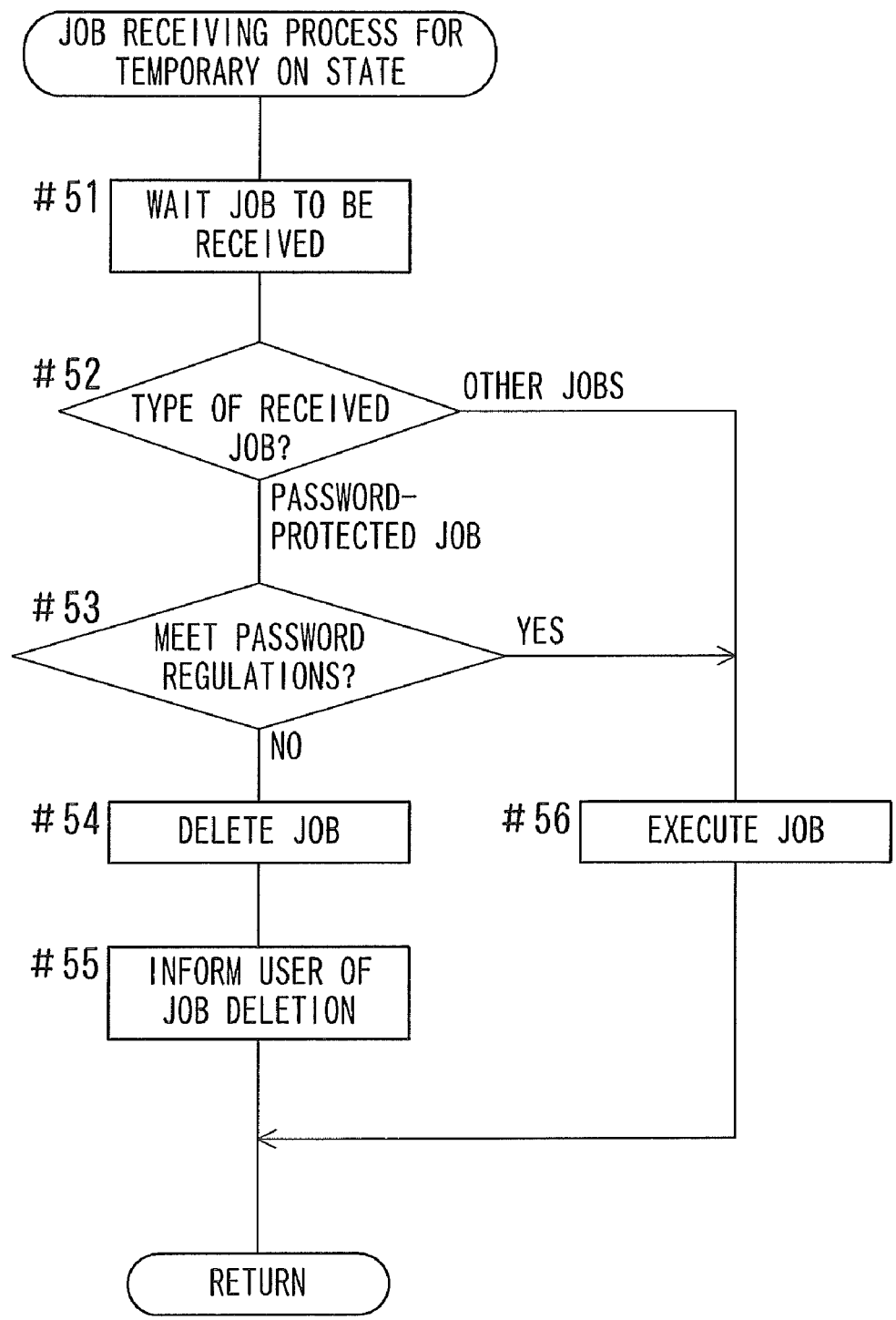
FIG. 10 is a flowchart illustrating an example of a job receiving routine when an image forming apparatus is in a temporary ON state.

FIG. 10 is a flowchart depicting a job receiving routine when the image forming apparatus 2 is in a temporary ON state. According to the routine, the image forming apparatus 2 waits for a new job to be received (#51), and responds to the new job received. If the newly-received job is not a password-protected job, then the image forming apparatus 2 executes the job (#52 and #56). The execution of the job includes registering and storing the job in the list if the job is a stored job. In contrast, if the newly-received job is a password-protected job, then the image forming apparatus 2 checks whether or not the password thereof satisfies the password regulations in the enhanced mode (#53). If the password of the job satisfies the password regulations in the enhanced mode, then the image forming apparatus 2 executes the job (#56). If the password of the job does not satisfy the password regulations in the enhanced mode, then the image forming apparatus 2 discards the job (#54). In the latter case, the image forming apparatus 2 sends, to the user, information that the job has been discarded (#55).

Sending such information to the user can prevent the user from being confused. While the image forming apparatus 2 is in the enhanced mode temporary ON state, some users do not possibly know that the password regulations have been tightened. This is because it has not been long since the password regulations were tightened. A job that is sent from such a user and contains an incomplete password is discarded as discussed above; thereby the security level of the image forming apparatus 2 is maintained at a certain level. However, if the user is not informed that the job has been discarded, then he/she does not understand why the job has been discarded and is possibly confused. Especially as for a stored job, it is probable that a user erases the original data at a client end because he/she assumes the stored job to be saved in the image forming apparatus 2. For the purpose of preventing such a situation, the user is informed that the stored job has been deleted. It is preferable that the information on the deletion should include the reason for deleting the stored job. For example, the following message is preferably included in the information: "This job cannot be executed due to the enhancement of the security level. Please change the password to a new one to satisfy the tightened password regulations." Such information may be sent to the user through electronic mail or unique communication using TCP/IP. Alternatively, such information may pop up on the display of the client.

The following is a description as to how the image forming apparatus 2 operates for a case where a user accesses a stored job while the image forming apparatus 2 is in the enhanced mode temporary ON state.

Figure 11:
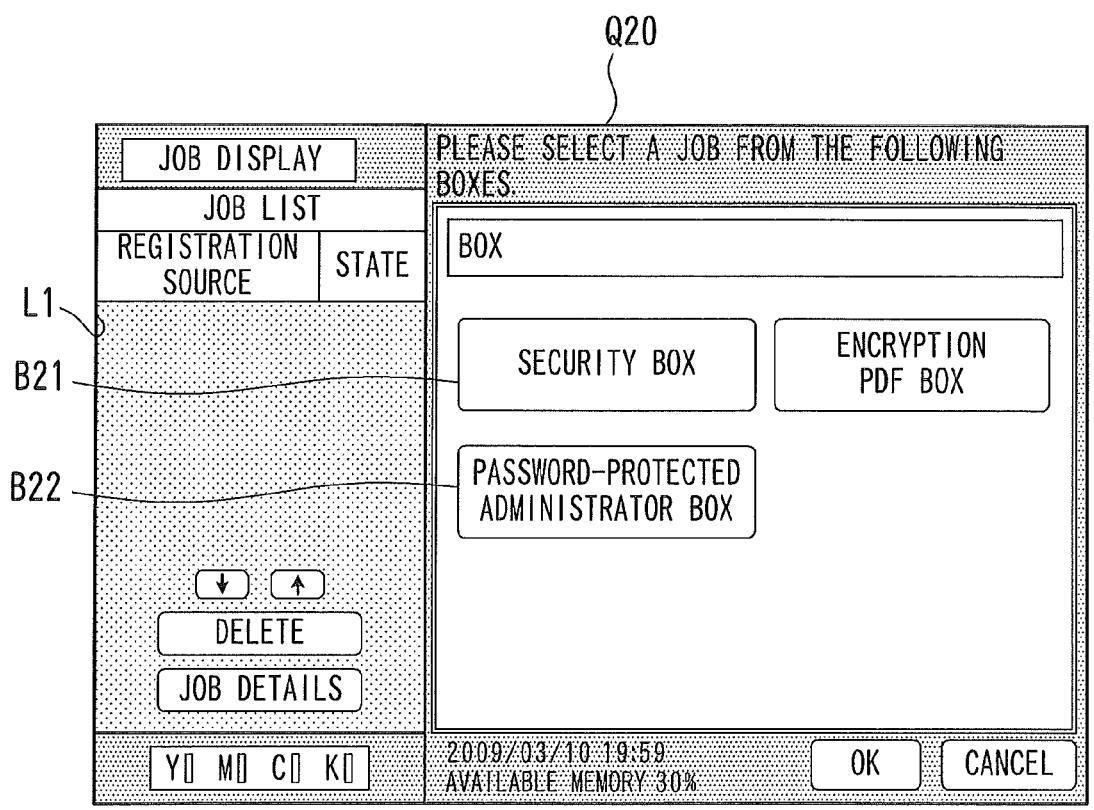
FIG. 11 is a diagram illustrating an example of a box screen for operation.

A password-protected stored job is saved in a security box (not shown) provided in the storage portion 13. A box screen Q20 as that shown in FIG. 11 is used for access to the security box. Referring to FIG. 11, the box screen Q20 has a selection button B21 for access to the security box.

Suppose that, as an example of access to a stored job, a user intends to cause the image forming apparatus 2 to execute security printing. In such a case, the user causes the image forming apparatus 2 to display the box screen Q20, and presses the selection button B21; thereby, the security box is selected. After the selection button B21 is pressed, a password entry screen Q21 shown in FIG. 12 is displayed. The user enters a confidential document ID and a password on the password entry screen Q21.

Figure 13:
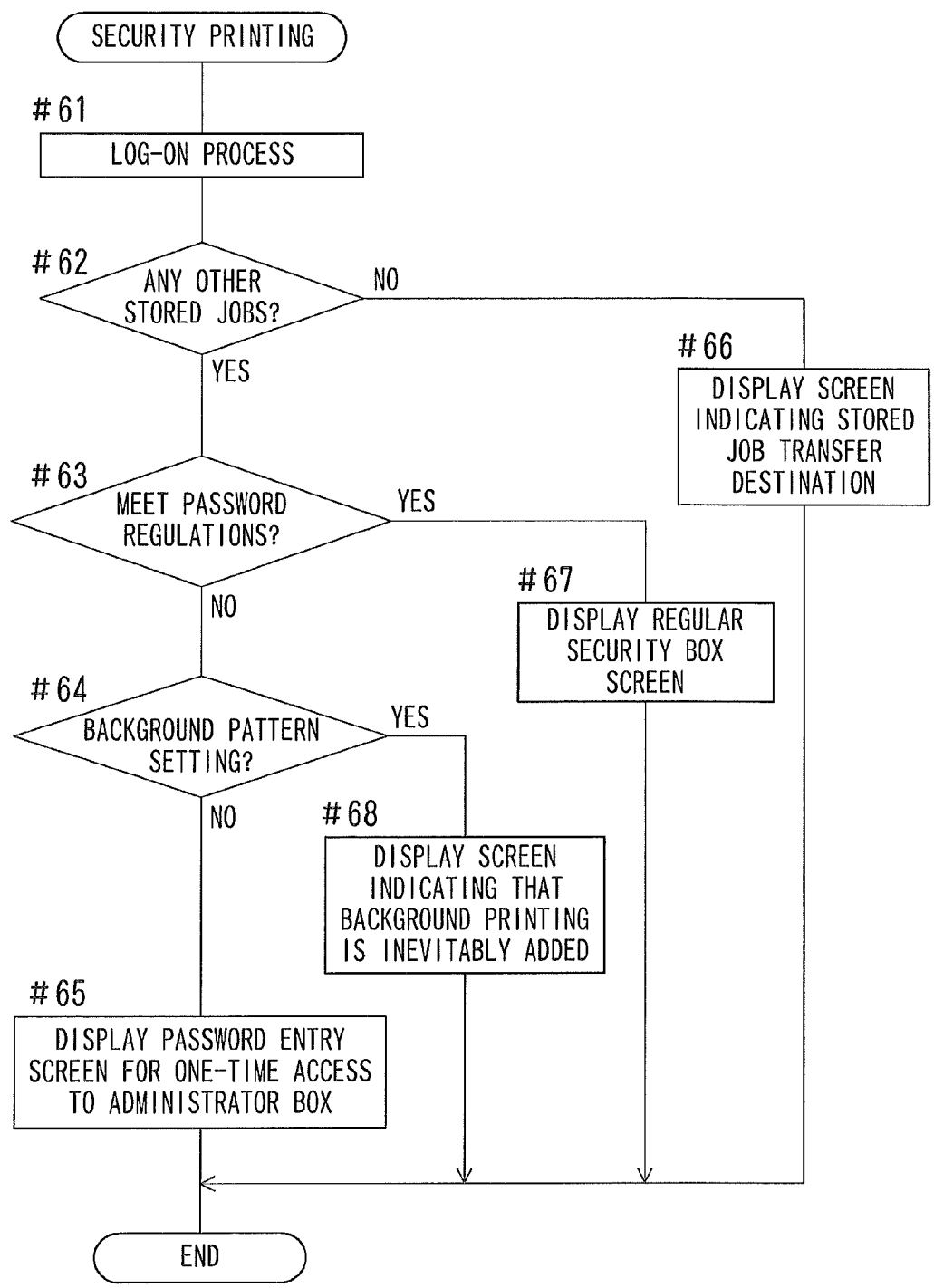
FIG. 13 is a flowchart illustrating an example of a security printing routine.

FIG. 13 is a flowchart depicting a security printing routine to be executed by the image forming apparatus 2. The image forming apparatus 2 receives access made by the user through a log-on process (#61), and checks whether or not a stored job specified by the user on the password entry screen Q21 is saved in the image forming apparatus 2 (#62). If such a stored job is found, then the image forming apparatus 2 checks whether or not a password of the stored job thus found satisfies password regulations (#63).

Figure 14:
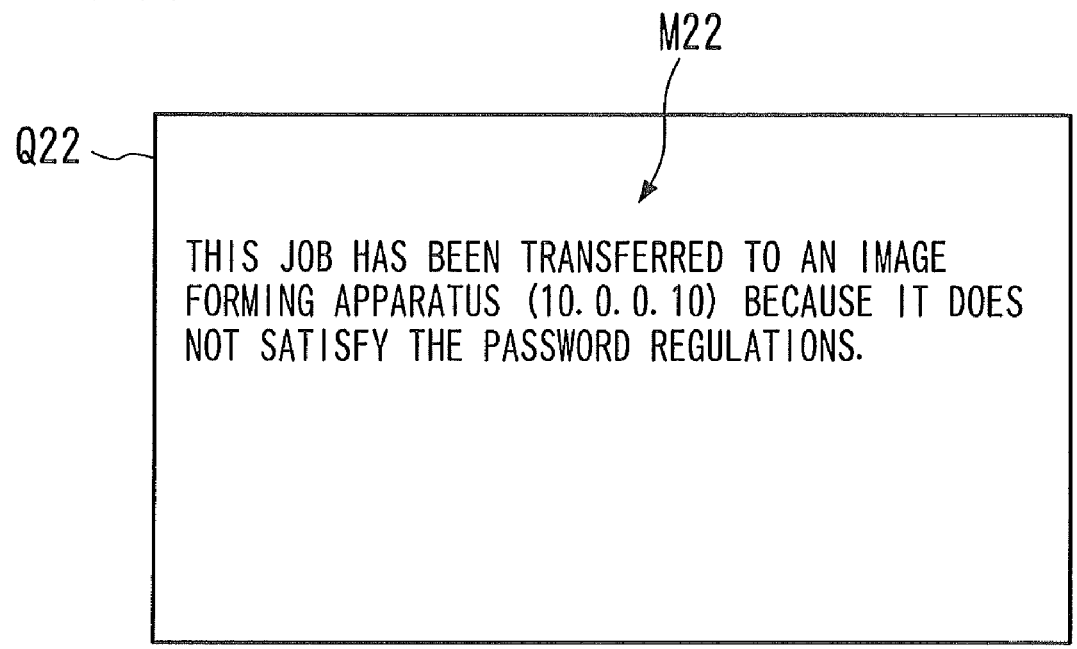
FIG. 14 is a diagram illustrating an example of a transfer destination informing screen for operation.

If a stored job specified by the user is not found in the image forming apparatus 2, then the image forming apparatus 2 refers to the deletion history of stored jobs and displays a transfer destination informing screen Q22 as that shown in FIG. 14 (#62 and #66). The transfer destination informing screen Q22 is to inform the user, in the form of a message M22, that the stored job has been transferred to another device and which device the stored job has been transferred to.

Figure 15:
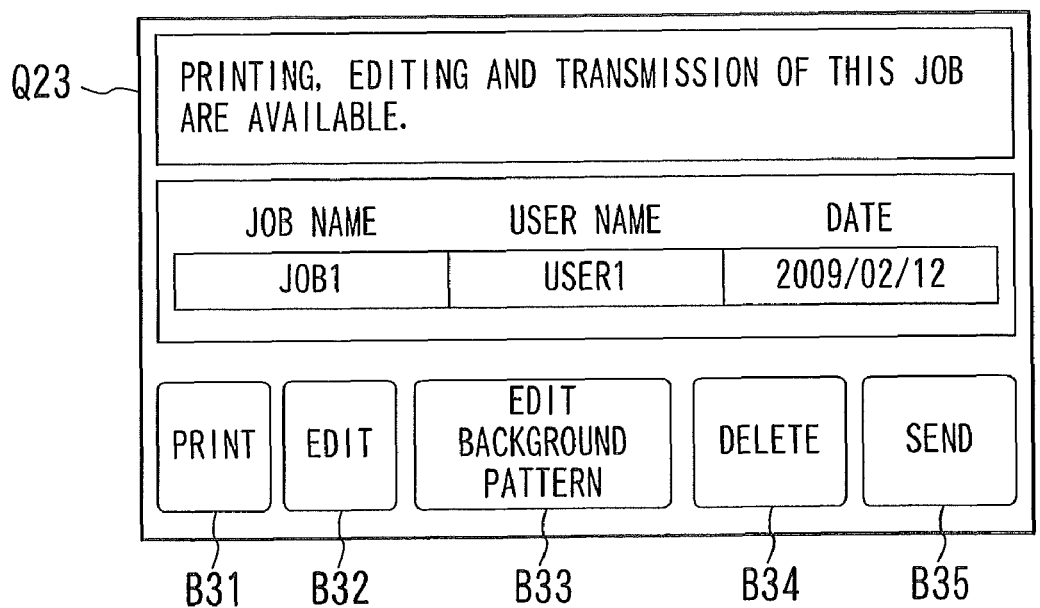
FIG. 15 is a diagram illustrating an example of a regular security printing screen for operation.

If the stored job specified by the user is saved in the image forming apparatus 2, and at the same time, the password of the specified stored job meets the password regulations, then the image forming apparatus 2 displays a regular security printing screen Q23 as that shown in FIG. 15. The user selectively presses a button B31, B32, B33, B34, or B35 on the security printing screen Q23; thereby to specify a process to be performed on a document corresponding to the stored job, such as a process of printing, editing, background pattern editing, deletion, transmission through facsimile or data transfer. For example, if the user presses the button B31, then the image forming apparatus 2 starts printing. Alternatively, if the user presses the button B33, then the image forming apparatus 2 displays an operation screen (not shown) for editing or removing a background pattern.

On the other hand, if the stored job specified by the user is saved in the image forming apparatus 2, and at the same time, the password of the specified stored job does not meet the password regulations, then the image forming apparatus 2 checks whether or not there is a background pattern setting in the stored job (#64).

Figure 16:
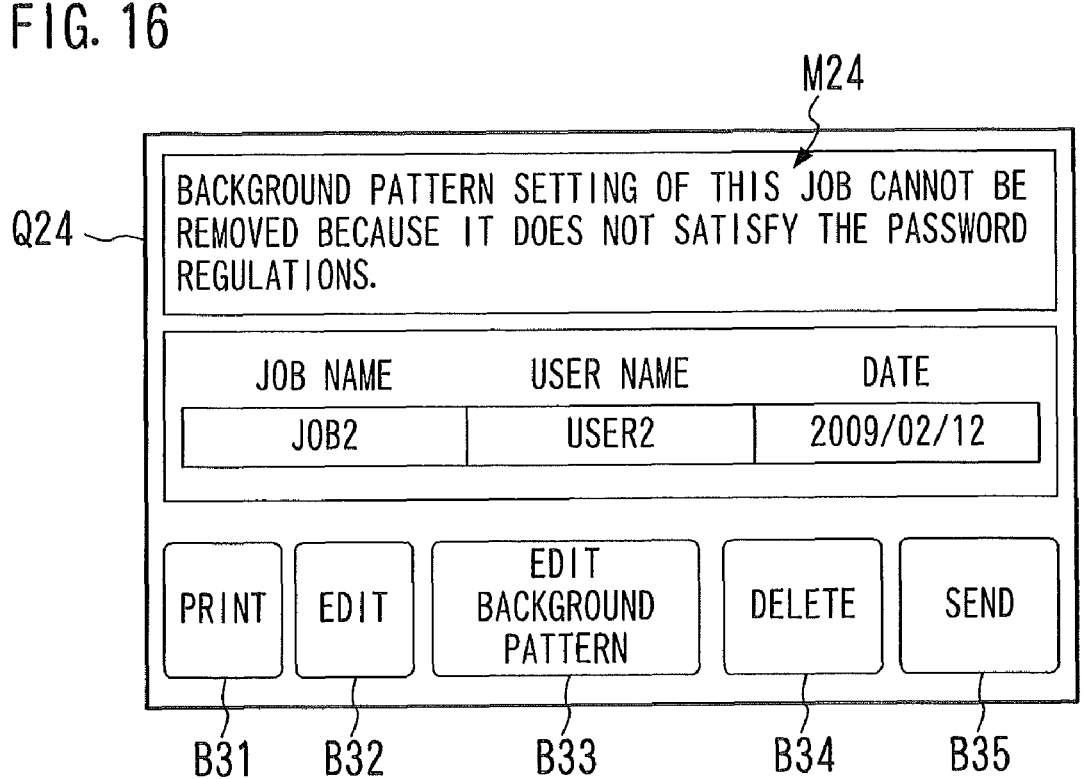
FIG. 16 is a diagram illustrating an example of a specific security printing screen for operation.

If there is a background pattern setting therein, then the image forming apparatus 2 displays a specific security printing screen Q24 as that shown in FIG. 16 (#68). The specific security printing screen Q24 contains therein a message M24 for informing the user that a background pattern is inevitably added to a document corresponding to the stored job in the process of printing the document. In the case where the specific security printing screen Q24 is displayed, the user is allowed to edit the background pattern after pressing the button B33, but, is not allowed to remove application of the background pattern to the document.

Figure 17:
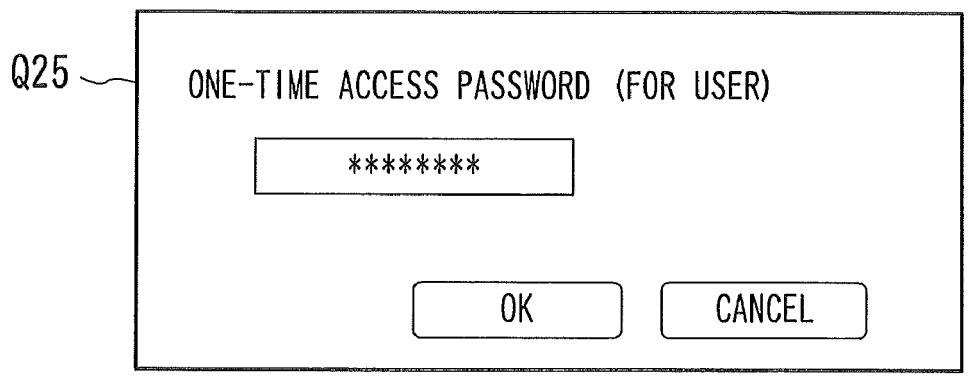
FIG. 17 is a diagram illustrating an example of a user password entry screen for operation.

If there is no background pattern setting in the stored job, then the image forming apparatus 2 displays a password entry screen Q25 as that shown in FIG. 17 (#65). The password entry screen Q25 is displayed for the user to access the stored job that has been transferred to the administrator box. The user inquires of the administrator as to a one-time password to be entered on the password entry screen Q25, and enters the one-time password. Thereby, the user is permitted to access the stored job only once.

Figure 18:
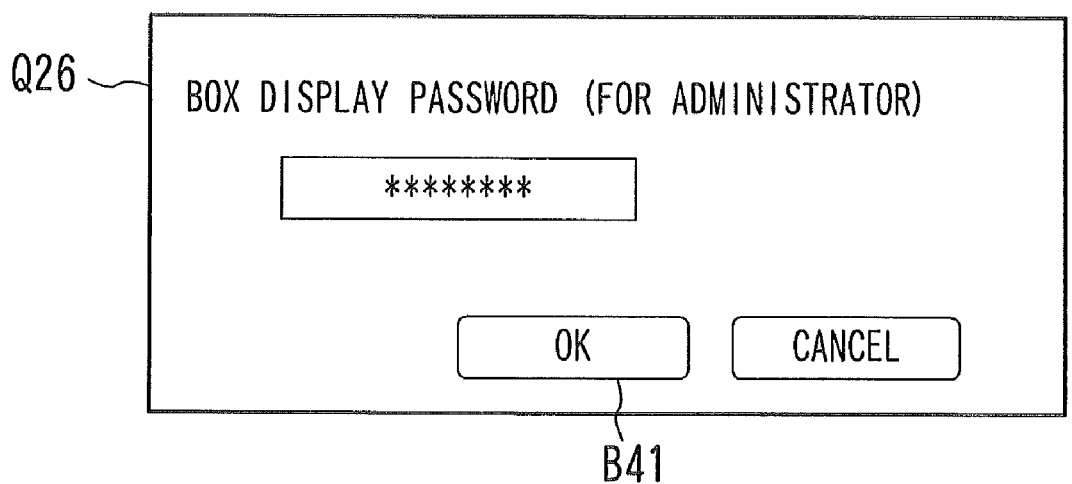
FIG. 18 is a diagram illustrating an example of an administrator password entry screen for operation.

The administrator enters a predetermined password on a password entry screen Q26 as that shown in FIG. 18, thereby to access the administrator box. The password entry screen Q26 is displayed at a time when the administrator presses a selection button B22 on the box screen Q20 of FIG. 11. The administrator enters a correct password on the password entry screen Q26 and presses an OK button B41. Responding to this, the image forming apparatus 2 displays a list of stored jobs that are saved in the administrator box and do not satisfy the security requirements of the image forming apparatus 2.

The embodiments discussed above take an example of a multifunction device that is an image forming apparatus; however, are not limited thereto. The present invention is applicable to information equipment in which the security level can be switched between two or more levels. The security requirements are not limited to the password format and the presence/absence of background pattern setting, and may be a confidentiality level of a document, the user authority to use a stored job function.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus having a function to store a job therein and to execute the job in accordance with a command, the image forming apparatus comprising:

a determination portion that, in response to operation for giving instructions to enhance a security level of the image forming apparatus, determines job stored includes a job that is not to satisfy security requirements after the security level is enhanced;

an execution portion that, if the determination portion determines that there is a job that is not to satisfy the security requirements, performs predetermined processing for satisfying the security requirements of the image forming apparatus with execution of the job ensured in the subject apparatus or another device; and a security mode switching portion that, if the determination portion determines that there is a job that is not to satisfy the security requirements, enhances the security level after the execution portion finishes the predetermined processing, and, if the determination portion determines that there is no job that is not to satisfy the security requirements, enhances the security level promptly;

wherein the predetermined processing is at least one of the following processes:

a process for encrypting data contained in the job, attaching the data to an electronic mail message to be sent to a user who has issued the job to send the data, and deleting the job after sending the data;

a process for transferring the job from the image forming apparatus to another device that is configured to execute and store said job therein, and deleting the job after the transfer; and a process for storing the job in a storage portion for an administrator to set a password for the storage portion or to encrypt the job to be stored by using a password, and the security requirements are at least any one of the following:

a password satisfying predetermined regulations;
presence of background pattern setting;
a document satisfying a predetermined confidentiality level; and
settings for user authority for using a stored job function.

2. The image forming apparatus according to claim 1, further comprising a display portion that displays an operation screen used to perform the operation for giving the instructions to enhance the security level, wherein the display portion displays the operation screen indicating that the image forming apparatus is in a preparation stage for turning a security mode into a mode to enhance the security level during a period from when the operation for giving the instructions to enhance the security level is performed to when the execution portion finishes the predetermined processing.

3. The image forming apparatus according to claim 1, wherein, when the user accesses the image forming apparatus for the job transferred by the execution portion to said another device, the image forming apparatus informs the user about said another device as a job transfer destination.

4. The image forming apparatus according to claim 1, wherein the image forming apparatus performs print operation for applying a background pattern to a document when a print job that does not satisfy the security requirements after the security level is enhanced is received during a period from when the operation for giving the instructions to enhance the security level is performed to when the execution portion finishes the predetermined processing.

5. A method for switching between security modes for information equipment having a function to store a job therein and to execute the job in accordance with a command, the method causing the information equipment to perform a process comprising:

upon turning the security mode from a non-enhanced mode into an enhanced mode, determining whether or not the job stored includes a job that does not satisfy security requirements in the enhanced mode;

if it is determined that there is a job that does not satisfy the security requirements in the enhanced mode, performing predetermined processing for satisfying the security requirements of the information equipment with execution of the job ensured in the subject apparatus or another device, and turning the security mode into the enhanced mode after the information equipment finishes the predetermined processing; and if it is determined that there is no job that does not satisfy the security requirements in the enhanced mode, turning the security mode into the enhanced mode without performing the predetermined processing;

wherein the predetermined processing is at least one of the following processes:

a process for encrypting data contained in the job, attaching the data to an electronic mail message to be sent to a user who has issued the job to send the data, and deleting the job after sending the data;

a process for transferring the job from the image forming apparatus to another device that is configured to execute and store said job therein, and deleting the job after the transfer; and a process for storing the job in a storage portion for an administrator to set a password for the storage portion or to encrypt the job to be stored by using a password, and the security requirements are at least any one of the following:

a password satisfying predetermined regulations;
presence of background pattern setting;
a document satisfying a predetermined confidentiality level; and
settings for user authority for using a stored job function.

6. The method according to claim 5, causing the information equipment to further perform a process comprising displaying an operation screen used to perform the operation for giving the instructions to enhance the security level, and displaying the operation screen indicating that the information equipment is in a preparation stage for turning the security mode into a mode to enhance the security level during a period from when the operation for giving the instructions to enhance the security level is performed to when the predetermined processing is finished.

7. The method according to claim 5, wherein, when the user accesses the information equipment for the job transferred by the information equipment to said another device, the information equipment informs the user about said another device as a job transfer destination.

8. The method according to claim 5, wherein the information equipment performs print operation for applying a background pattern to a document when a print job that does not satisfy the security requirements in the enhanced mode is received during a period from when the operation for giving the instructions to enhance the security level is performed to when the predetermined processing is finished.

9. A non-transitory computer-readable storage medium storing thereon a computer program used in a computer provided in an image forming apparatus having a function to store a job therein and to execute the job in accordance with a command, the computer program causing the computer to perform:

determining, in response to operation for giving instructions to enhance a security level of the image forming apparatus, whether or not the job stored includes a job that is not to satisfy security requirements after the security level is enhanced;

performing, if it is determined that there is a job that is not to satisfy the security requirements, predetermined processing for satisfying the security requirements of the image forming apparatus with execution of the job ensured in the subject apparatus or another device; and enhancing, if it is determined that there is a job that is not to satisfy the security requirements, the security level after the predetermined processing is finished, and, enhancing, if it is determined that there is no job that is not to satisfy the security requirements, the security level promptly;

wherein the predetermined processing is at least one of the following processes:
   a process for encrypting data contained in the job, attaching the data to an electronic mail message to be sent to a user who has issued the job to send the data, and deleting the job after sending the data;
   a process for transferring the job from the image forming apparatus to another device that is configured to execute and store said job therein, and deleting the job after the transfer; and
   a process for storing the job in a storage portion for an administrator to set a password for the storage portion or to encrypt the job to be stored by using a password, and the security requirements are at least any one of the following:
   a password satisfying predetermined regulations;
   presence of background pattern setting;
   a document satisfying a predetermined confidentiality level; and
   settings for user authority for using a stored job function.

10. The non-transitory computer-readable storage medium according to claim 9, the computer program causing the computer to further perform
   displaying an operation screen used to perform the operation for giving the instructions to enhance the security level, and
   displaying the operation screen indicating that the image forming apparatus is in a preparation stage for turning a security mode into a mode to enhance the security level during a period from when the operation for giving the instructions to enhance the security level is performed to when the predetermined processing is finished.

11. The non-transitory computer-readable storage medium according to claim 9, wherein, when the user accesses the image forming apparatus for the job transferred by the image forming apparatus to said another device, the computer program causes the computer to inform the user about said another device as a job transfer destination.

12. The non-transitory computer-readable storage medium according to claim 9, the computer program causing the image forming apparatus to perform print operation for applying a background pattern to a document when a print job that does not satisfy the security requirements after the security level is enhanced is received during a period from when the operation for giving the instructions to enhance the security level is performed to when the predetermined processing is finished.

* * * * *